(12) United States Patent
Allen et al.

(10) Patent No.: US 7,076,573 B2
(45) Date of Patent: Jul. 11, 2006

(54) METHOD, APPARATUS, AND PROGRAM FOR DETECTING SEQUENTIAL AND DISTRIBUTED PATH ERRORS IN MPIO

(75) Inventors: James Patrick Allen, Austin, TX (US); Timothy M. Damron, Austin, TX (US); Stephen M. Tee, Marble Falls, TX (US); Teerasit Tinnakul, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 10/718,096

(22) Filed: Nov. 20, 2003

(65) Prior Publication Data

US 2005/0154797 A1 Jul. 14, 2005

(51) Int. Cl.
*G06F 15/173* (2006.01)
*G06F 13/00* (2006.01)

(52) U.S. Cl. .............. 710/17; 710/15; 710/16; 710/45; 709/223; 709/224; 714/30; 714/39; 714/43; 714/48

(58) Field of Classification Search ............ 710/17, 710/15, 45; 709/223, 224; 714/30, 39, 43, 714/48
See application file for complete search history.

(56) References Cited

U.S. PATENT DOCUMENTS

| | | | | |
|---|---|---|---|---|
| 4,228,513 A * | 10/1980 | Doljack | ............... | 198/810.02 |
| 4,330,885 A | 5/1982 | Abbott et al. | ............... | 370/17 |
| 4,611,336 A | 9/1986 | Fryer | ............... | 375/111 |
| 4,726,022 A * | 2/1988 | Chan et al. | ............... | 714/704 |
| 5,117,288 A | 5/1992 | Eisenhardt et al. | ............... | 358/136 |
| 5,214,784 A * | 5/1993 | Ward et al. | ............... | 714/39 |
| 5,404,565 A | 4/1995 | Gould et al. | ............... | 395/800 |
| 5,559,645 A * | 9/1996 | Miyazawa et al. | ............... | 360/51 |
| 5,784,391 A | 7/1998 | Konigsburg | ............... | 371/40.18 |
| 6,034,946 A | 3/2000 | Roginsky et al. | ............... | 370/238 |
| 6,145,028 A | 11/2000 | Shank et al. | ............... | 710/31 |

(Continued)

FOREIGN PATENT DOCUMENTS

WO WO9429983 5/1996

OTHER PUBLICATIONS

IBM Technical Disclosure Bulletin, "Serial Data Channel Analysis System", vol. 27, No. 11, Apr. 1985, pp. 6430-6436.

(Continued)

*Primary Examiner*—Tammara Peyton
(74) *Attorney, Agent, or Firm*—Duke W. Yee; Marilyn Smith Dawkins; Mary Adams-Moe

(57) ABSTRACT

An error detection mechanism is provided for detecting sequential and distributed errors in a device I/O stream. The sensitivity of the errors is user definable. The result of the error detection is fed back into the path management software, which may use the error information to decide whether a device path should be disabled. The error detection mechanism sets a time span for a time window and counts the number of errors that occur during the time window. Each time a time window ends with at least one error, the sequential error count and the distributed error count are incremented. However, if an I/O returns without an error, the sequential error count is cleared. If the sequential error count reaches a predetermined limit, the path is disabled. After a predetermined number of time windows, if the distributed error count reaches a predetermined limit, the path is disabled.

26 Claims, 3 Drawing Sheets

U.S. PATENT DOCUMENTS

| | | | |
|---|---|---|---|
| 6,192,411 B1 | 2/2001 | Chan et al. | 709/232 |
| 6,233,256 B1 | 5/2001 | Dieterich et al. | 370/506 |
| 6,434,637 B1 | 8/2002 | D'Errico | 710/38 |
| 6,571,285 B1 * | 5/2003 | Groath et al. | 709/223 |
| 6,604,203 B1 * | 8/2003 | Mu et al. | 713/400 |
| 6,744,748 B1 * | 6/2004 | Boulton et al. | 370/333 |
| 6,834,341 B1 * | 12/2004 | Bahl et al. | 713/156 |
| 2002/0194319 A1 | 12/2002 | Ritche | 709/223 |
| 2003/0046645 A1 * | 3/2003 | Boehm | 716/5 |

OTHER PUBLICATIONS

IBM Technical Disclosure Bulletin, "Input/Output Event Analysis", vol. 40, No. 7, Jul. 1997, pp. 117-128.

* cited by examiner

METHOD, APPARATUS, AND PROGRAM FOR DETECTING SEQUENTIAL AND DISTRIBUTED PATH ERRORS IN MPIO

BACKGROUND OF THE INVENTION

1. Technical Field

The present invention relates to storage area networks and, in particular, to multi-path input/output in a storage area network. Still more particularly, the present invention provides a method, apparatus, and program for detecting sequential and distributed errors in a multi-path input/output environment.

2. Description of Related Art

A storage area network (SAN) is a network of storage devices. In large enterprises, a SAN connects multiple machines to a centralized pool of disk storage. Compared to managing hundreds of servers, each with their own storage devices, a SAN improves system administration.

In multiple path input/output (MPIO), there is a plurality of routes or connections from one specific machine to one specific device. For example, with a logical disk device on a storage subsystem, the accessing host uses a fibre channel (FC) adapter connected to an FC switch, and the FC switch in turn is attached to the storage subsystem. There may be eight, or as many as thirty-two or more, FC adapters in both the host and the device and there may be many more FC switches in the SAN fabric.

Considering a SAN with eight adapters in the host and two in the device, if each host adapter is connected to a device adapter through a switch, then there may be from one to sixteen paths from the host to the device. If the switches are interconnected, then there may be many more paths from the host to the device.

Path management software chooses paths to be used for each device. The path management software receives a generic error code for whether an input/output (I/O) operation succeeds or fails. However, the path management software does not have access to the sense data returned from the device during an I/O operation. Due to this limitation, current generations of path management software may only detect that an I/O operation has failed to complete. In fact, if an I/O operation fails, the path management software typically attempts a retry on the same path. If the path fails a number of times, the path management software fails over to another path.

However, a problem may exist with a path, but the path management software considers each I/O operation on that path a success even though every I/O operation succeeds on a retry. For example, every I/O operation may succeed on a path after two or more retries. Clearly, there is a problem with the path. However, the path management software is unable to detect the problem.

Current path management programs cannot detect sequential or distributed errors in the actual device I/O stream until the level of performance is well below the abilities of the device and connection. In some cases, these products would never monitor device performance and, therefore, would never detect poor device path performance. Sequential errors are errors that occur consecutively on a path. Distributed errors are errors that occur sporadically over time. As such, current path management programs experience slow device path fail-over times and, in some cases, poor device performance due to the inability to detect degraded path performance.

SUMMARY OF THE INVENTION

The present invention recognizes the disadvantages of the prior art and provides error detection code for detecting sequential and distributed errors in a device I/O stream. The sensitivity of the errors is user definable. The result of the error detection is fed back into the path management software, which may use the error information to decide whether a device path should be disabled.

The error detection mechanism sets a time span for a time window and counts the number of errors that occur during the time window. Each time a time window ends with at least one error, the sequential error count and the distributed error count are incremented. However, if an I/O returns without an error, the sequential error count is cleared. If the sequential error count reaches a predetermined limit, the path is disabled. After a predetermined number of time windows, if the distributed error count reaches a predetermined limit, the path is disabled.

When I/O stops and starts again after the time span expires, a new time window is started. Therefore, the error detection mechanism of the present invention only monitors for errors while I/O operations are occurring and is therefore insensitive to device inactivity. The time span may be recalculated to minimize the effects of a device queue flush being detected as multiple path errors.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
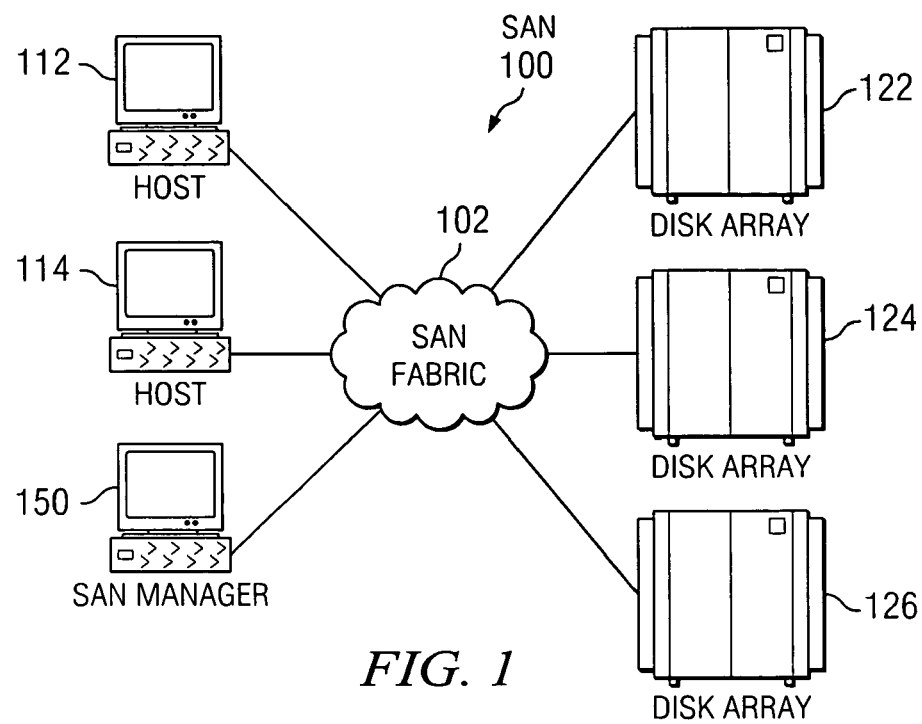
FIG. 1 depicts a pictorial representation of a storage area network in which the present invention may be implemented.

With reference now to the figures, FIG. 1 depicts a pictorial representation of a storage area network in which the present invention may be implemented. Storage area network (SAN) 100 contains SAN fabric 102, which is a combination of interconnected switches, which collectively provide a routing infrastructure within SAN 100.

In the depicted example, hosts 112, 114 are connected to fabric 102 along with disk arrays 122, 124, 126. Hosts 112, 114 may be, for example, personal computers, network computers, servers, or the like. In the depicted example, hosts 112, 114 access disk arrays 122, 124, 126 through paths in the SAN fabric. SAN 100 may include additional hosts and/or other storage devices not shown. FIG. 1 is intended as an example, and not as an architectural limitation for the present invention.

Figure 2:
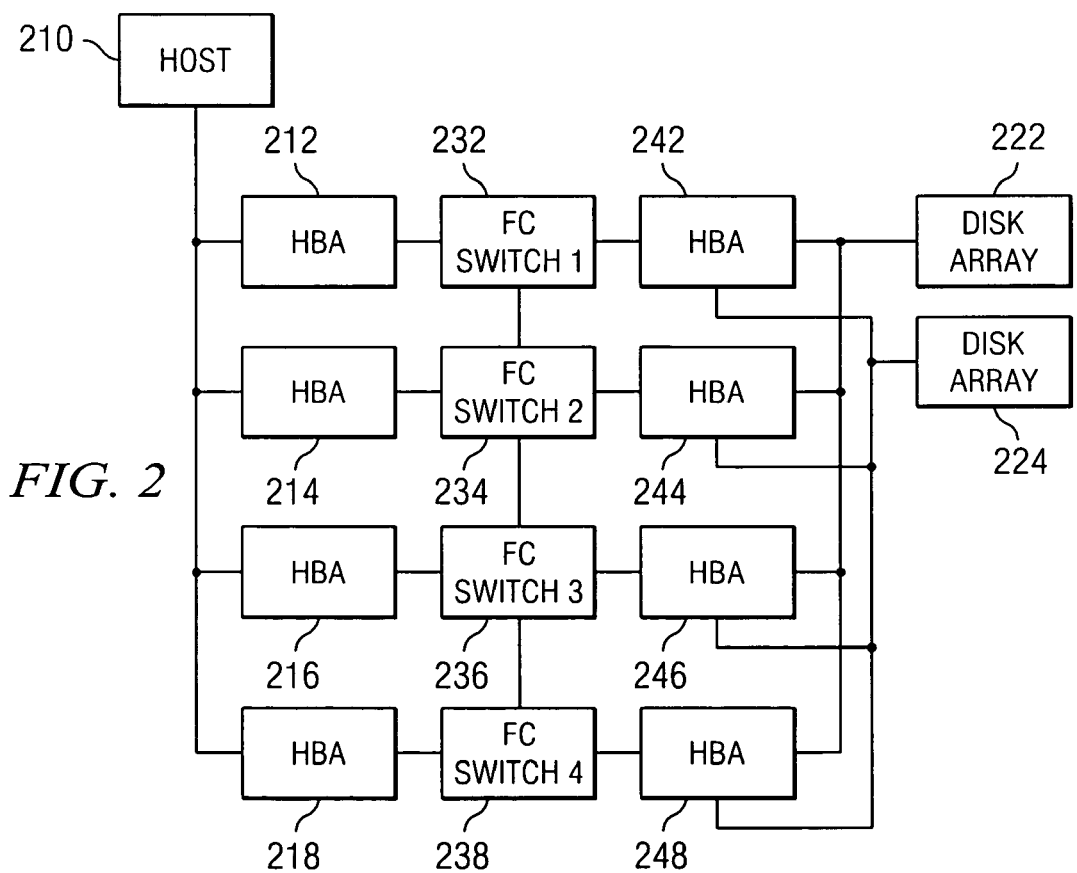
FIG. 2 depicts an example storage area network configuration in accordance with a preferred embodiment of the present invention.

FIG. 2 depicts an example storage area network configuration in accordance with a preferred embodiment of the present invention. Host 210 is connected to a plurality of host bus adapters 212, 214, 216, 218. In the depicted example, the target devices are disk arrays 222, 224. The disk arrays are connected to host bus adapters 242, 244, 246, 248. Host bus adapter 212 is connected to host bus adapter 242 through fibre channel (FC) switch 1 232. Similarly, host bus adapter 214 is connected to host bus adapter 244 through FC switch 2 234, host bus adapter 216 is connected to host bus adapter 246 through FC switch 3 236, and host bus adapter 218 is connected to host bus adapter 248 through FC switch 4 238.

The host and the disk array are connected to the SAN fabric through four host bus adapters. Typically, a host or disk array will be connected to between eight and thirty-two host bus adapters; however, more or fewer host bus adapters may be connected depending upon the implementation.

With interconnection between the switches and multiple levels of switches, the number of paths may become extensive. In addition, many of the paths share resources. Path management software in host 210 for disk array 222 selects a path for I/O to the disk array.

In accordance with a preferred embodiment of the present invention, error detection code in host 210 monitors for failed I/O operations and detects sequential and distributed errors for a device path. The sensitivity of the errors is user definable. The result of the error detection is fed back into the path management software, which may use the error information to decide whether a device path should be disabled.

The error detection mechanism sets a time span for a time window and counts the number of errors that occur during the time window. Each time a time window ends with at least one error, the sequential error count and the distributed error count are incremented. However, if an I/O returns without an error, the sequential error count is cleared. If the sequential error count reaches a predetermined limit, the path is disabled. After a predetermined number of time windows, if the distributed error count reaches a predetermined limit, the path is disabled.

When I/O stops and starts again after the time span expires, a new time window is started. Therefore, the error detection mechanism of the present invention only monitors for errors while I/O operations are occurring. The time span may be recalculated to minimize the effects of a device queue flush being detected as multiple path errors.

Figure 3:
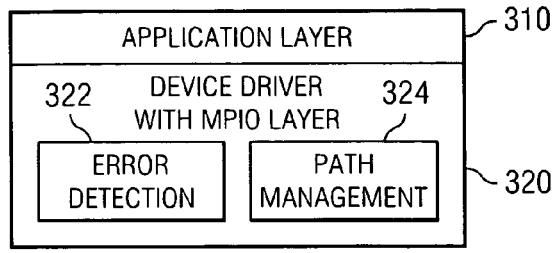
FIG. 3 is a block diagram illustrating a software configuration within a host computer in accordance with a preferred embodiment of the present invention.

FIG. 3 is a block diagram illustrating a software configuration within a host computer in accordance with a preferred embodiment of the present invention. Application layer 310 sends I/O operations for device driver layer 320. In an exemplary embodiment, the device driver layer includes MPIO functionality. When I/O is to be sent to the storage subsystem, path management software 324 selects one of a plurality of paths as the transmission conduit.

Error detection 322 detects errors in the device I/O stream. When the selection of a path is done, a timestamp is set in a data structure within the I/O command. Each time an I/O operation completes, the I/O timestamp is used in a calculation. The calculation to be performed depends on whether the I/O command completed successfully or not and whether the I/O timestamp of the command fell within a time window. The results of the error detection are fed into path management software 324, which may use the error information to decide whether a device path should be disabled.

FIG. 3 is intended as an example and is not meant to limit the present invention. Modifications may be made to the software configuration within the scope of the present invention. For example, path management code may be embodied in an MPIO virtual device driver layer above device driver layer 320. Other modifications will be apparent to those of ordinary skill in the art.

Figure 4B:
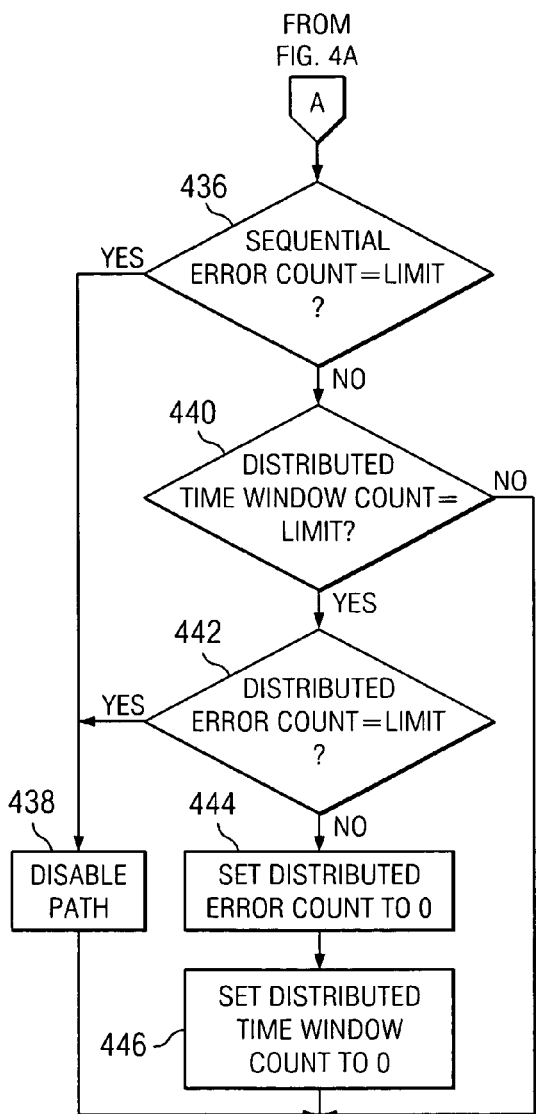
FIGS. 4A and 4B are flowcharts illustrating the operation of an error detection mechanism responsive to an I/O returning from the storage subsystem in accordance with a preferred embodiment of the present invention.
Figure 4A:
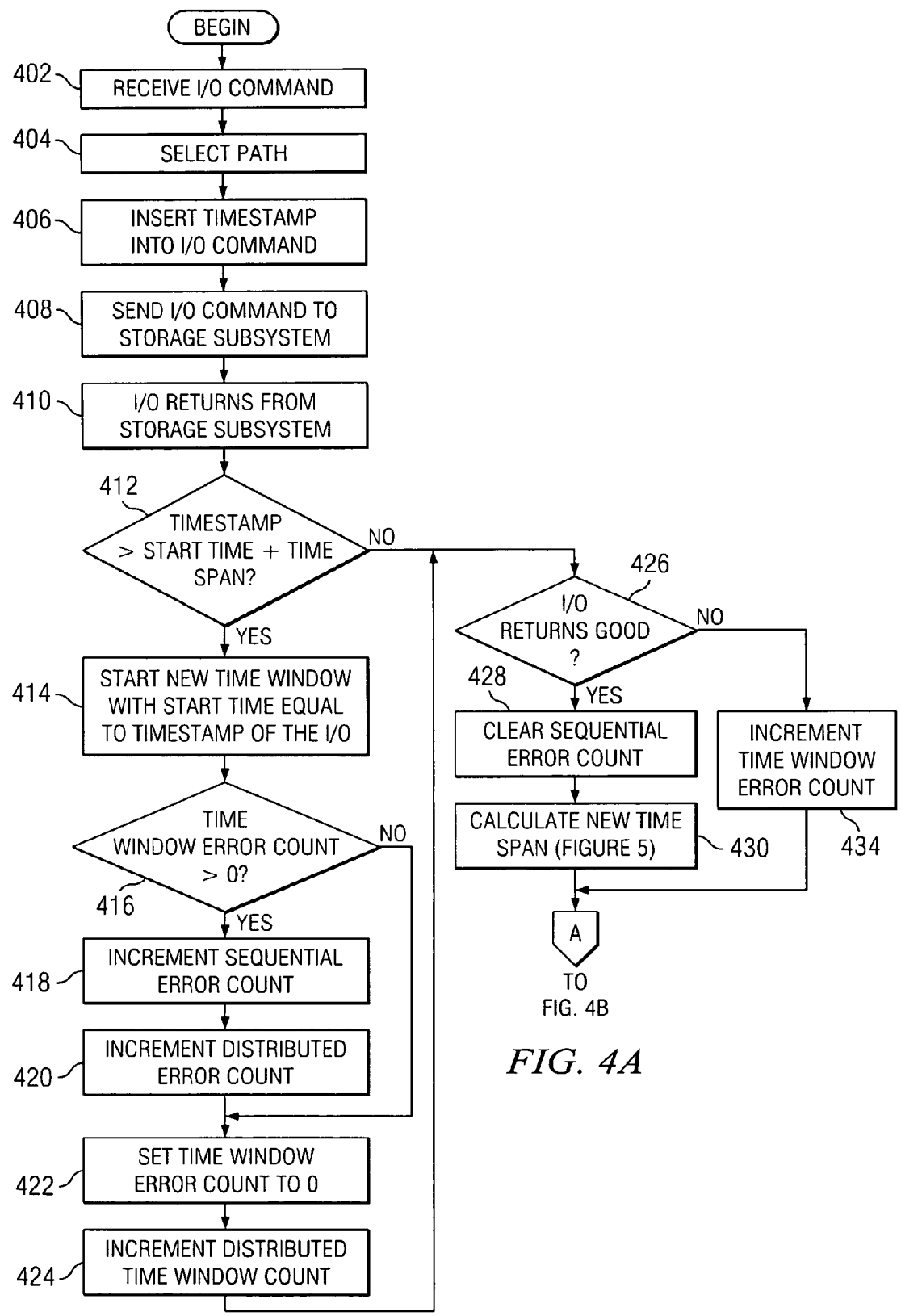

With reference to FIGS. 4A and 4B, flowcharts illustrating the operation of an error detection mechanism responsive to an I/O returning from the storage subsystem are shown in accordance with a preferred embodiment of the present invention. The process begins and receives an I/O command (step 402). The path management software selects a path for the I/O command (step 404). The process inserts a timestamp into the I/O command (step 406). The timestamp is a time frame used to sample I/O operations. Then, the process sends the I/O command to the storage subsystem (step 408) and the I/O returns from the storage subsystem (step 410) as successful or failed.

Each time an I/O operation completes, the I/O timestamp is used in a calculation. The calculation to be performed depends on whether the I/O command completed successfully or not and whether the I/O timestamp falls within a time window. A determination is made as to whether the timestamp is greater than the start time plus a current value of the time span (step 412). The start time is the timestamp used to mark the beginning of a time window. The time span is the length in time of a time window. The time span is determined by a calculation that determines the average time to process a good I/O. In other words, in step 412, the process determines whether or not the timestamp is within the current time window.

If the timestamp is not within the current time window, the process starts a new time window with the start time equal to the timestamp of the I/O command (step 414). Next, a determination is made as to whether the time window error count is greater than zero (step 416). The time window error count is the number of I/O operations returning with an error within the time window.

If the time window error count is greater than zero, the process increments the sequential error count (step 418) and increments the distributed error count (step 420). The sequential error count is the number of sequential I/O errors occurring on a path to a device. The distributed error count is the number of distributed I/O errors occurring on the path to the device. Distributed errors typically occur singly, rather than in pairs or groupings.

Thereafter or responsive to the time window error count not being greater than zero in step 416, the process sets the time window error count to zero (step 422) and increments the distributed time window count (step 424). The distributed time window count is the number of time windows that have occurred since the last time the number of distributed errors was checked against a distributed error limit.

Thereafter or responsive to the timestamp being within a current time window in step 412, a determination is made as to whether the I/O returns without an error (step 426). If the I/O is successful, the process clears the sequential error count (step 428). In other words, the sequential error count is set to zero. Then, the process calculates a new time span (step 430). The process of calculating the time span is described in further detail below with respect to FIG. 5.

The reason for the time span calculation is to minimize the effects of a device queue flush being detected as multiple path errors. When multiple commands are queued to a device, they will have timestamps that all fall within the time span. If the adapter or device flushes these commands back to the host driver, they are counted as multiple time window errors. However, they only get counted as a single sequential error. This prevents erroneous path failures from occurring, which could degrade device performance.

If the I/O does not return successful in step 426, then the I/O returns with an error and the process increments the time window error count (step 434). Thereafter or following step 430, the process makes a determination as to whether the sequential error count is equal to the sequential error count limit (step 436). The sequential error count limit is the maximum number of sequential errors that can occur before a path is determined to be unusable. This value is user selectable. If the sequential error count is equal to the sequential error count limit, the process disables the path (step 438) and ends.

If the sequential error count is not equal to the limit, the process makes a determination as to whether the distributed time window count is equal to the distributed time window count limit (step 440). The distributed time window count limit is the number of time windows to be included in calculating the number of distributed errors. This value is user selectable. If the distributed time window count is not equal to the limit, the process ends.

If the distributed time window count is equal to the distributed time window count limit in step 440, a determination is made as to whether the distributed error count is equal to the distributed error count limit (step 442). The distributed error count limit is the maximum number of distributed errors that can occur before a path is determined to be unusable. This value is user selectable. If the distributed error count is equal to the limit, the process disables the path (step 438) and ends.

If the distributed error count is not equal to the distributed error count limit in step 442, the process sets the distributed error count to zero (step 444). Then, the process sets the distributed time window count to zero (step 446). Thereafter, the process ends.

Figure 5:
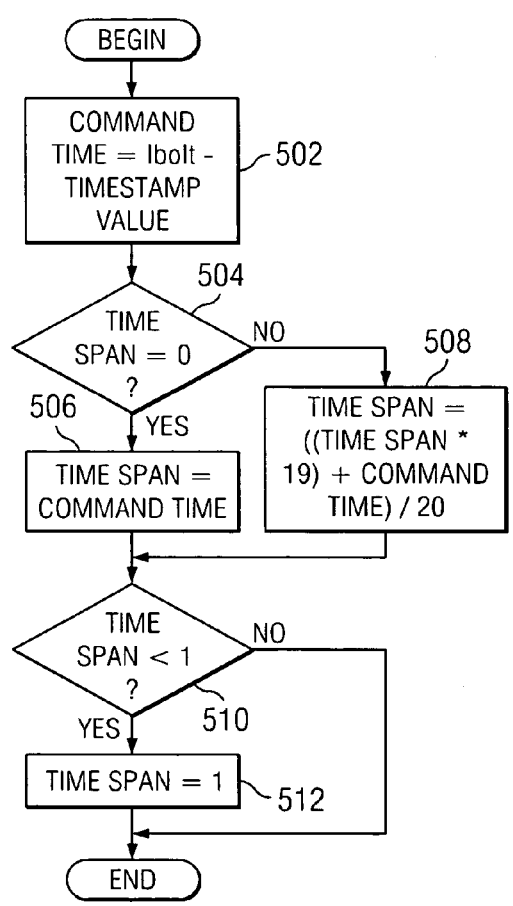
FIG. 5 is a flowchart illustrating a process for calculating the time span for a time window in accordance with an exemplary embodiment of the present invention.

Turning now to FIG. 5, a flowchart illustrating a process for calculating the time span for a time window is shown in accordance with an exemplary embodiment of the present invention. The process begins and the command time is set to lbolt plus the timestamp value (step 502). The command time is the length in time that it took to process the command. lbolt is a variable on the host system that contains the time since the machine was last booted.

Next, a determination is made as to whether the time span is equal to zero (step 504). If the time span is equal to zero, the process sets the time span to be equal to the command time (step 506). Otherwise, in step 508 the process calculates the time span as follows:

$$time\_span = \frac{(time\_span * 19) + command\_time}{20}$$

This calculation determines an average time to process a good I/O operation. Other calculations for determining an average may also be used within the scope of the present invention.

After calculating the time span in step 506 or step 508, a determination is made as to whether the time span is less than one (step 510). If the time span is less than one, the time span is set to a value of one (step 512) and the process ends. If the time span is not less than one in step 510, the process ends.

Thus, the present invention solves the disadvantages of the prior art by providing a mechanism for detecting sequential and distributed errors in a device I/O stream. I/O commands that return with an error are always counted as time window errors. The time window spans a time frame that is based on the time to process a good command. Basing the time window on good commands ensures that typical device or transport problems are always seen as a sequential error.

The time span is not a fixed value; therefore, changes in system loads and variations in transport speeds are taken in to account. Otherwise, setting the value too high might result in spurious path failures if the system load changes. On the other hand, setting the value too low might result in slow path failure times. The time span also handles the condition that can occur when multiple I/O commands queued to a device are all returned at the same time due to a single error condition. The time span methodology integrates these multiple errors into a single sequential error.

The need to detect random errors distributed over time is easily handled by the present invention. If an error occurs within a time window, the error count for the time window is incremented. When a new time window is started, the distributed error count is incremented. When a set number of time windows, set by user input, have been counted, the distributed error count is compared to a limit set by the user. Thus, the present invention allows detection of errors spread over a large time frame. Since time windows are only started when the timestamp of an I/O operation is outside the present time window, the error detection mechanism is not susceptible to device inactivity, which may cause spurious peaks in distributed error counts.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for detecting errors in a device path, the method comprising:

setting a time span for a time window based on a time to process a successful input/output command;

starting the time window;

responsive to the time window ending, determining whether at least one input/output error occurs on a device path during the time window;

responsive to one or more input/output errors occurring on the device path during the time window, incrementing an error count by one;

determining whether the error count reaches a predetermined limit; and responsive to the error count reaching the predetermined limit, disabling the device path.

2. The method of claim 1, wherein the time span is dependent upon system loads and variations in transport speeds.

3. The method of claim 1, wherein monitoring a device input/output stream includes monitoring input/output retries, input/output errors, and a time to process an input/output command during the time window.

4. The method of claim 1, further comprising:

responsive to an input/output command returning successful, determining a new time span for the time window.

5. The method of claim 4, wherein determining a new time span for the time window includes:

determining an average time to process a good input/output operation.

6. The method of claim 1, further comprising:

responsive to an input/output command returning with a timestamp outside a current time window, starting a new time window.

7. The method of claim 6, further comprising:

setting a start time of the new time window equal to the timestamp of the input/output command.

8. The method of claim 1, wherein the error count is a sequential error count.

9. The method of claim 8, further comprising:

responsive to an input/output command returning successful, setting the sequential error count to zero.

10. The method of claim 1, wherein the error count is a distributed error count.

11. The method of claim 10, wherein determining whether the error count reaches a predetermined limit is performed responsive to a predetermined number of time windows being counted.

12. The method of claim 1, wherein determining whether one or more input/output errors occur on a device path during a time window is performed responsive to an input/output command returning with a timestamp outside a current time window.

13. An apparatus for detecting errors in a device path, the apparatus comprising:

means for setting a time span for a time window based on a time to process a successful input/output command;

means for starting the time window;

means, responsive to the time window ending, for determining whether one or more input/output errors occur on a device path during a time window;

means, responsive to one or more input/output errors occurring on the device path during the time window, for incrementing an error count;

means for determining whether the error count reaches a predetermined limit; and means, responsive to the error count reaching the predetermined limit, for disabling the device path.

14. The apparatus of claim 13, further comprising:

means, responsive to an input/output command returning successful, for determining a new time span for the time window.

15. The apparatus of claim 14, wherein the means for determining a new time span for the time window includes:

means for determining an average time to process a good input/output operation.

16. The apparatus of claim 13, further comprising:

means, responsive to an input/output command returning with a timestamp outside a current time window, for starting a new time window.

17. The apparatus of claim 16, further comprising:

means for setting a start time of the new time window equal to the timestamp of the input/output command.

18. The apparatus of claim 13, wherein the error count is a sequential error count.

19. The apparatus of claim 18, further comprising:

means, responsive to an input/output command returning successful, for setting the sequential error count to zero.

20. The apparatus of claim 13, wherein the error count is a distributed error count.

21. The apparatus of claim 20, wherein determining whether the error count reaches a predetermined limit is performed responsive to a predetermined number of time windows being counted.

22. The apparatus of claim 13, wherein determining whether at least one input/output error occurs on a device path during a time window is performed responsive to an input/output command returning with a timestamp outside a current time window.

23. A computer program product, in a computer readable medium, for detecting errors in a device path, the computer program product comprising:

instructions for setting a time span for a time window based on a time to process a successful input/output command;

instructions for starting the time window;

instructions, responsive to the time window ending, for determining whether at least one input/output error occurs on a device path during the time window;

instructions, responsive to one or more input/output errors occurring on the device path during the time window, for incrementing an error count by one;

instructions for determining whether the error count reaches a predetermined limit; and instructions, responsive to the error count reaching the predetermined limit, for disabling the device path.

24. The method of claim 1, wherein determining a new time span for the time window comprises:

determining if the time span equals zero;

responsive to the time span equaling zero, setting the time span to command time; and responsive to the time span not equaling zero, setting the time span equal to (19* time span+command time)/20.

25. The apparatus of claim 13, wherein means for determining a new time span for the time window further comprises:

means for determining if the time span equals zero;

means, responsive to the time span equaling zero, for setting to time span to command time; and means, responsive to the time scan not equaling zero, for setting time span equal to (19* time span+command time)/20.

26. The computer program product of claim 23, wherein means for determining a new time span for the time window further comprises:

instructions for determining if time span equals zero;

instructions, responsive to time span equaling zero, for setting the time span to command time; and instructions, responsive to the time span not equaling zero, for setting time span equal to (19* time span+command time)/20.

* * * * *